US009298287B2

(12) United States Patent
Heck et al.

(10) Patent No.: US 9,298,287 B2
(45) Date of Patent: Mar. 29, 2016

(54) COMBINED ACTIVATION FOR NATURAL USER INTERFACE SYSTEMS

(75) Inventors: Larry Paul Heck, Los Altos, CA (US); Madhusudan Chinthakunta, Saratoga, CA (US); David Mitby, Mountain View, CA (US); Lisa Stifelman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 13/077,368

(22) Filed: Mar. 31, 2011

(65) Prior Publication Data

US 2012/0254810 A1 Oct. 4, 2012

(51) Int. Cl.
*G06F 3/0487* (2013.01)
*G06F 3/038* (2013.01)
*G06F 3/01* (2006.01)
*G10L 15/22* (2006.01)
*G06F 3/16* (2006.01)

(52) U.S. Cl.
CPC .............. *G06F 3/038* (2013.01); *G06F 3/017* (2013.01); *G06F 3/0487* (2013.01); *G06F 3/167* (2013.01); *G10L 15/22* (2013.01); *G06F 2203/0381* (2013.01)

(58) Field of Classification Search
CPC ....... G06F 3/0487; G06F 3/167; G06F 3/017; G06F 3/04883
USPC ................ 715/863, 721–728, 765, 708–712, 715/716–719
See application file for complete search history.

(56) References Cited

U.S. PATENT DOCUMENTS

| 4,560,977 | A | 12/1985 | Murakami et al. |
| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,727,354 | A | 2/1988 | Lindsay |
| 4,751,642 | A | 6/1988 | Silva et al. |

(Continued)

FOREIGN PATENT DOCUMENTS

| CN | 101254344 B | 6/2010 |
| EP | 0 357 909 A1 | 3/1990 |

(Continued)

OTHER PUBLICATIONS

Senior, et al., Article entitled "Augmenting Conversational Dialogue by Means of Latent Semantic Googling,"—Published Date: Oct. 4-6, 2005, Trento, Italy; 7 pages, http://www.hml.queensu.ca/files/po265-senior.pdf.

(Continued)

*Primary Examiner* — Steven Sax
(74) *Attorney, Agent, or Firm* — Steven Spellman; Tom Wong; Micky Minhas

(57) ABSTRACT

A user interaction activation may be provided. A plurality of signals received from a user may be evaluated to determine whether the plurality of signals are associated with a visual display. If so, the plurality of signals may be translated into an agent action and a context associated with the visual display may be retrieved. The agent action may be performed according to the retrieved context and a result associated with the performed agent action may be displayed to the user.

20 Claims, 3 Drawing Sheets

(56) References Cited

U.S. PATENT DOCUMENTS

| | | |
|---|---|---|
| 4,772,946 A | 9/1988 | Hammer |
| 4,796,997 A | 1/1989 | Svetkoff et al. |
| 4,809,065 A | 2/1989 | Harris et al. |
| 4,811,398 A | 3/1989 | Copperi et al. |
| 4,817,950 A | 4/1989 | Goo |
| 4,843,568 A | 6/1989 | Krueger et al. |
| 4,868,750 A | 9/1989 | Kucera et al. |
| 4,893,183 A | 1/1990 | Nayar |
| 4,901,362 A | 2/1990 | Terzian |
| 4,925,189 A | 5/1990 | Braeunig |
| 4,969,192 A | 11/1990 | Chen et al. |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,265,014 A | 11/1993 | Haddock et al. |
| 5,288,078 A | 2/1994 | Capper et al. |
| 5,295,491 A | 3/1994 | Gevins |
| 5,320,538 A | 6/1994 | Baum |
| 5,325,298 A | 6/1994 | Gallant |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,600,765 A | 2/1997 | Ando et al. |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,680,628 A | 10/1997 | Carus et al. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,748,974 A | 5/1998 | Johnson |
| 5,861,886 A | 1/1999 | Moran et al. |
| 5,875,108 A | 2/1999 | Hoffberg et al. |
| 5,877,803 A | 3/1999 | Wee et al. |
| 5,880,743 A | 3/1999 | Moran et al. |
| 5,913,727 A | 6/1999 | Ahdoot |
| 5,930,746 A | 7/1999 | Ting |
| 5,933,125 A | 8/1999 | Fernie et al. |
| 5,970,446 A | 10/1999 | Goldberg et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,111,580 A | 8/2000 | Kazama et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,212,494 B1 | 4/2001 | Boguraev |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,396 B1 | 5/2001 | Marugame |
| 6,229,913 B1 | 5/2001 | Nayar et al. |
| 6,246,981 B1 | 6/2001 | Papineni et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,345,111 B1 | 2/2002 | Yamaguchi et al. |
| 6,363,160 B1 | 3/2002 | Bradski et al. |
| 6,384,819 B1 | 5/2002 | Hunter |
| 6,397,179 B2 | 5/2002 | Crespo et al. |
| 6,401,086 B1 | 6/2002 | Brucker |
| 6,411,725 B1 * | 6/2002 | Rhoads ............ G06F 17/30876 375/E7.089 |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,658,377 B1 | 12/2003 | Anward et al. |
| 6,661,918 B1 | 12/2003 | Gordon et al. |
| 6,665,640 B1 | 12/2003 | Bennett et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,895,083 B1 | 5/2005 | Bers et al. |
| 6,937,742 B2 | 8/2005 | Roberts et al. |
| 6,950,534 B2 | 9/2005 | Cohen et al. |
| 6,970,947 B2 | 11/2005 | Ebling et al. |
| 6,990,639 B2 | 1/2006 | Wilson |
| 6,999,932 B1 | 2/2006 | Zhou |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,050,977 B1 | 5/2006 | Bennett |
| 7,058,204 B2 | 6/2006 | Hildreth et al. |
| 7,060,957 B2 | 6/2006 | Lange et al. |
| 7,100,082 B2 | 8/2006 | Little |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Heldreth et al. |
| 7,231,609 B2 | 6/2007 | Baudisch |
| 7,251,781 B2 | 7/2007 | Batchilo et al. |
| 7,259,747 B2 | 8/2007 | Bell |
| 7,272,601 B1 | 9/2007 | Wang et al. |

(56) References Cited

U.S. PATENT DOCUMENTS

| | | |
|---|---|---|
| 7,308,112 B2 | 12/2007 | Fujimura et al. |
| 7,317,836 B2 | 1/2008 | Fujimura et al. |
| 7,328,216 B2 | 2/2008 | Hofmann et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,519,223 B2 | 4/2009 | Dehlin et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,596,767 B2 * | 9/2009 | Wilson ........................ 715/863 |
| 7,598,942 B2 | 10/2009 | Underkoffler et al. |
| 7,606,700 B2 | 10/2009 | Ramsey et al. |
| 7,607,509 B2 | 10/2009 | Schmiz et al. |
| 7,620,202 B2 | 11/2009 | Fujimura et al. |
| 7,640,164 B2 | 12/2009 | Sasaki et al. |
| 7,665,041 B2 | 2/2010 | Wilson et al. |
| 7,668,340 B2 | 2/2010 | Cohen et al. |
| 7,672,845 B2 | 3/2010 | Beranek et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,716,056 B2 | 5/2010 | Weng et al. |
| 7,720,674 B2 | 5/2010 | Kaiser et al. |
| 7,720,856 B2 | 5/2010 | Goedecke et al. |
| 7,729,530 B2 | 6/2010 | Antonov et al. |
| 7,746,345 B2 | 6/2010 | Hunter |
| 7,747,438 B2 | 6/2010 | Nguyen et al. |
| 7,756,708 B2 | 7/2010 | Cohen et al. |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| 7,890,500 B2 | 2/2011 | Bobrow et al. |
| 7,890,539 B2 | 2/2011 | Boschee et al. |
| RE42,256 E | 3/2011 | Edwards |
| 7,898,522 B2 | 3/2011 | Hildreth et al. |
| 8,000,453 B2 | 8/2011 | Cooper et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,108,208 B2 | 1/2012 | Makela |
| 8,117,635 B2 * | 2/2012 | Hendricks ............... H04H 20/10 715/723 |
| 8,144,840 B2 | 3/2012 | Leuhrig et al. |
| 8,155,962 B2 | 4/2012 | Kennewick et al. |
| 8,180,629 B2 | 5/2012 | Rehberg |
| 8,260,817 B2 | 9/2012 | Boschee et al. |
| 8,265,925 B2 | 9/2012 | Aarskog |
| 8,317,518 B2 | 11/2012 | Jarrell |
| 8,335,754 B2 | 12/2012 | Dawason et al. |
| 8,380,489 B1 | 2/2013 | Zhang |
| 8,448,083 B1 * | 5/2013 | Migos ................ G06F 3/04883 345/671 |
| 8,489,115 B2 | 7/2013 | Rodriguez et al. |
| 8,521,766 B1 | 8/2013 | Hoarty |
| 8,595,222 B2 | 11/2013 | Dean |
| 8,600,747 B2 | 12/2013 | Abella et al. |
| 8,612,208 B2 | 12/2013 | Cooper et al. |
| 8,825,661 B2 | 9/2014 | Joshi et al. |
| 9,064,006 B2 | 6/2015 | Hakkani-Tur et al. |
| 9,082,402 B2 | 7/2015 | Yadgar |
| 9,123,341 B2 | 9/2015 | Weng |
| 2001/0020954 A1 * | 9/2001 | Hull ................. G06F 17/30038 715/730 |
| 2003/0125955 A1 | 7/2003 | Arnold et al. |
| 2003/0236099 A1 | 12/2003 | Deisher et al. |
| 2004/0078725 A1 | 4/2004 | Little |
| 2004/0122674 A1 | 6/2004 | Bangalore et al. |
| 2004/0172460 A1 | 9/2004 | Marel et al. |
| 2004/0189720 A1 | 9/2004 | Wilson et al. |
| 2004/0193420 A1 | 9/2004 | Kennewick et al. |
| 2004/0220797 A1 | 11/2004 | Wang et al. |
| 2005/0033582 A1 | 2/2005 | Gadd et al. |
| 2005/0074140 A1 | 4/2005 | Grasso et al. |
| 2005/0289124 A1 | 12/2005 | Kaiser et al. |
| 2006/0074631 A1 | 4/2006 | Wang et al. |
| 2006/0074883 A1 | 4/2006 | Teevan et al. |
| 2006/0080101 A1 | 4/2006 | Chotimongkol et al. |
| 2006/0136375 A1 | 6/2006 | Cox et al. |
| 2006/0173868 A1 | 8/2006 | Angele et al. |
| 2006/0206333 A1 | 9/2006 | Paek et al. |
| 2006/0206336 A1 | 9/2006 | Gurram et al. |
| 2006/0206454 A1 | 9/2006 | Forstall et al. |
| 2006/0271353 A1 | 11/2006 | Berkan |
| 2006/0271356 A1 | 11/2006 | Berkan et al. |
| 2006/0271520 A1 | 11/2006 | Ragan |
| 2006/0293874 A1 | 12/2006 | Zhang et al. |
| 2007/0038436 A1 | 2/2007 | Cristo et al. |
| 2007/0071209 A1 | 3/2007 | Horvitz et al. |
| 2007/0100624 A1 | 5/2007 | Weng et al. |
| 2007/0118357 A1 | 5/2007 | Kasravi et al. |
| 2007/0124134 A1 | 5/2007 | Van Kommer |
| 2007/0136068 A1 | 6/2007 | Horvitz |
| 2007/0136222 A1 | 6/2007 | Horvitz |
| 2007/0299799 A1 | 12/2007 | Meehan et al. |
| 2008/0005068 A1 | 1/2008 | Dumais et al. |
| 2008/0026838 A1 | 1/2008 | Dunstan et al. |
| 2008/0040510 A1 | 2/2008 | Warner et al. |
| 2008/0080678 A1 | 4/2008 | Ma et al. |
| 2008/0082518 A1 | 4/2008 | Loftesness |
| 2008/0097951 A1 | 4/2008 | Gupta et al. |
| 2008/0140657 A1 | 6/2008 | Azvine et al. |
| 2008/0152191 A1 | 6/2008 | Fujimura et al. |
| 2008/0167876 A1 | 7/2008 | Bakis et al. |
| 2008/0168037 A1 | 7/2008 | Kapadia et al. |
| 2008/0172359 A1 | 7/2008 | Lundell et al. |
| 2008/0201280 A1 | 8/2008 | Martin et al. |
| 2008/0201434 A1 | 8/2008 | Holmes et al. |
| 2008/0221870 A1 | 9/2008 | Attardi et al. |
| 2008/0228467 A1 | 9/2008 | Womack et al. |
| 2008/0231926 A1 | 9/2008 | Klug et al. |
| 2008/0235199 A1 | 9/2008 | Li et al. |
| 2008/0300871 A1 | 12/2008 | Gilbert |
| 2008/0319962 A1 | 12/2008 | Riezler et al. |
| 2009/0006333 A1 | 1/2009 | Jones et al. |
| 2009/0006345 A1 | 1/2009 | Platt et al. |
| 2009/0006389 A1 | 1/2009 | Piscitello et al. |
| 2009/0012842 A1 | 1/2009 | Srinivasan et al. |
| 2009/0027337 A1 | 1/2009 | Hildreth |
| 2009/0055380 A1 | 2/2009 | Peng et al. |
| 2009/0076917 A1 | 3/2009 | Jablokov et al. |
| 2009/0077047 A1 | 3/2009 | Cooper et al. |
| 2009/0079813 A1 | 3/2009 | Hildreth |
| 2009/0089126 A1 | 4/2009 | Odubiyi |
| 2009/0094036 A1 | 4/2009 | Ehlen et al. |
| 2009/0112596 A1 | 4/2009 | Syrdal et al. |
| 2009/0112782 A1 | 4/2009 | Cross et al. |
| 2009/0144933 A1 | 6/2009 | Wagg |
| 2009/0177645 A1 | 7/2009 | Heck |
| 2009/0221368 A1 | 9/2009 | Yen et al. |
| 2009/0232288 A1 | 9/2009 | Forbes et al. |
| 2009/0234655 A1 | 9/2009 | Kwon |

(56) References Cited

U.S. PATENT DOCUMENTS

| | | |
|---|---|---|
| 2009/0248422 A1 | 10/2009 | Li et al. |
| 2009/0248659 A1 | 10/2009 | McCool et al. |
| 2009/0292687 A1 | 11/2009 | Fan et al. |
| 2009/0315740 A1 | 12/2009 | Hildreth et al. |
| 2000/0023320 | 1/2010 | Di Cristo et al. |
| 2010/0023320 A1 | 1/2010 | DiCristo et al. |
| 2010/0023331 A1 | 1/2010 | Duta et al. |
| 2010/0036717 A1* | 2/2010 | Trest ............... 705/14.1 |
| 2010/0036831 A1 | 2/2010 | Vemuri |
| 2010/0057463 A1 | 3/2010 | Weng et al. |
| 2010/0057801 A1 | 3/2010 | Ramer et al. |
| 2010/0093435 A1 | 4/2010 | Glaser et al. |
| 2010/0095206 A1 | 4/2010 | Kim |
| 2010/0121839 A1 | 5/2010 | Meyer |
| 2010/0138215 A1 | 6/2010 | Williams |
| 2010/0161642 A1 | 6/2010 | Chen et al. |
| 2010/0169098 A1* | 7/2010 | Patch ............... 704/275 |
| 2010/0199227 A1* | 8/2010 | Xiao et al. ............... 715/863 |
| 2010/0205180 A1 | 8/2010 | Cooper et al. |
| 2010/0217604 A1 | 8/2010 | Baldwin et al. |
| 2010/0235341 A1 | 9/2010 | Bennett |
| 2010/0235375 A1 | 9/2010 | Sidhu et al. |
| 2010/0250518 A1 | 9/2010 | Bruno |
| 2010/0274796 A1 | 10/2010 | Beauregard et al. |
| 2010/0281435 A1 | 11/2010 | Bangalore et al. |
| 2010/0306591 A1 | 12/2010 | Krishna |
| 2010/0313125 A1* | 12/2010 | Fleizach ............ G06F 3/04883 715/702 |
| 2010/0318398 A1 | 12/2010 | Brun et al. |
| 2010/0318549 A1 | 12/2010 | Mayr |
| 2011/0016005 A1 | 1/2011 | Li et al. |
| 2011/0022992 A1* | 1/2011 | Zhou et al. ............... 715/863 |
| 2011/0040777 A1 | 2/2011 | Stefanov |
| 2011/0099476 A1 | 4/2011 | Snook et al. |
| 2011/0137943 A1 | 6/2011 | Asano |
| 2011/0144999 A1 | 6/2011 | Jang et al. |
| 2011/0219340 A1* | 9/2011 | Pathangay ............ G06F 3/01 715/863 |
| 2011/0313768 A1* | 12/2011 | Klein et al. ............... 704/251 |
| 2011/0320470 A1 | 12/2011 | Williams et al. |
| 2011/0320945 A1* | 12/2011 | Wong ............ G06F 3/04886 715/716 |
| 2012/0030637 A1* | 2/2012 | Dey et al. ............... 715/863 |
| 2012/0035924 A1 | 2/2012 | Jitkoff et al. |
| 2012/0082353 A1 | 4/2012 | Kelusky et al. |
| 2012/0130822 A1* | 5/2012 | Patwa et al. ............... 705/14.69 |
| 2012/0131073 A1 | 5/2012 | Olney |
| 2012/0216151 A1* | 8/2012 | Sarkar et al. ............... 715/863 |
| 2012/0242586 A1* | 9/2012 | Krishnaswamy ... G06F 3/04886 345/173 |
| 2012/0253788 A1 | 10/2012 | Heck et al. |
| 2012/0253789 A1 | 10/2012 | Heck et al. |
| 2012/0253790 A1 | 10/2012 | Heck et al. |
| 2012/0253791 A1 | 10/2012 | Heck et al. |
| 2012/0253802 A1 | 10/2012 | Heck et al. |
| 2012/0254227 A1 | 10/2012 | Heck et al. |
| 2012/0290290 A1 | 11/2012 | Tur et al. |
| 2012/0296643 A1 | 11/2012 | Kristjansson et al. |
| 2012/0316862 A1 | 12/2012 | Sultan et al. |
| 2012/0327009 A1* | 12/2012 | Fleizach ............ G06F 3/04883 345/173 |
| 2013/0117022 A1 | 5/2013 | Chen et al. |
| 2013/0185081 A1 | 7/2013 | Cheyer et al. |
| 2014/0059030 A1 | 2/2014 | Hakkani-Tur et al. |

FOREIGN PATENT DOCUMENTS

| | | |
|---|---|---|
| EP | 0 583 061 A2 | 2/1994 |
| EP | 0 919 906 A2 | 6/1999 |
| EP | 1 335 338 A3 | 8/2003 |
| EP | 1 335 338 A2 | 12/2007 |
| JP | 8-44490 | 2/1996 |
| JP | 2003-505712 | 2/2003 |
| KR | 1020050032649 | 4/2005 |
| KR | 10-1007336 B1 | 1/2011 |
| KR | 10-2011-0066357 | 6/2011 |
| TW | 504624 B | 10/2002 |
| WO | WO 93/10708 | 6/1993 |
| WO | WO 95/19031 | 7/1995 |
| WO | WO 97/17598 | 5/1997 |
| WO | WO 98/03907 | 1/1998 |
| WO | WO 99/42920 | 8/1999 |
| WO | WO 99/44698 | 9/1999 |
| WO | WO 00/73900 A1 | 12/2000 |
| WO | WO 00/73995 A2 | 12/2000 |
| WO | WO 00/75808 A1 | 12/2000 |
| WO | WO 01/69365 A1 | 9/2001 |
| WO | WO 02/15560 A2 | 2/2002 |
| WO | WO 2007/064482 A1 | 6/2007 |
| WO | 2008/049206 A1 | 5/2008 |
| WO | WO 2008/069519 | 6/2008 |
| WO | WO 2009/059065 | 5/2009 |

OTHER PUBLICATIONS

Wang, et al., Article entitled "Idea Expander: Agent-Augmented Online Brainstorming,"—Published Date: Feb. 6-10, 2010, Savannah, Georgia; 2 pages, http://research.microsoft.com/en-us/um/redmond/groups/connect/cscw_10/docs/p535.pdf.

Lyons, et al., Article entitled "Augmenting Conversations Using Dual-Purpose Speech,"—Published Date: 2004; College of Computing and GVU Center, Georgia Institute of Technology, Atlanta, Georgia; 10 pages. http://www.cc.gatech.edu/ccg/publications/dp-uist.pdf.

Sherwani, et al., Article entitled "VoicePedia: Towards Speech-based Access to Unstructured Information,"—Published Date: 2007; 4 pages http://www.cs.cmu.edu/~jsherwan/pubs/voicepedia.pdf.

Website: The Future of Voice Arrives—Published Date: Jan. 11, 2007; 2 pages http://www.voicebox.com/technology/.

Mairesse, et al., Article entitled Learning to Personalize Spoken Generation for Dialogue Systems—Published Date: 2005; 4 pages. http://citeseerx.ist.psu.edu/viewdoc/download?doi=10.1.1.66.9988&rep=rep1&type=pdf.

Nguyen, et al., Article entitled "An Adaptive Plan Based Dialogue Agent: Integrating Learning into a BDI Architecture," Published Date: May 8-12, 2006 at AAMASA '06 in Hakodate, Hokkaido, Japan; 3 pages. http://www.cse.unsw.edu.au/~wobcke/papers/adaptive-dialogue.pdf.

Website: Fully automated conversation dialog systems, Published Date: Jun. 10, 2008; 2 pages. http://www.gyruslogic.com/.

Technical Whitepaper entitled "Speak With Me, Inc." Retrieved Date: Sep. 24, 2010; 11 pages. http://www.speakwithme.com/files/pdf/whitepaper.pdf.

Castells, et al., Article entitled "Scalable semantic personalized search of spoken and written contents on the Semantic Web,A" Published Date: 2005; 12 pages. http://webcache.googleusercontent.com/search?q=cache:http://ir.ii.uam.es/s5t/informes/TIN2005-06885.pdf.

Marcialis, et al., Article entitled "SEARCHY: An Agent to Personalize Search Results," Published Date: Jun. 20, 2008 at the IEEE Third International Conference on Internet and Web Applications and Services Conference; 6 pages. http://ieeexplore.ieee.org/stamp/stamp.jsp?tp=&arnumber=4545664.

Tomuro et al., Article entitled "Personalized Search in Folksonomies with Ontological User Profiles," Retrieved Date: Sep. 30, 2010; 14 pages. http://facweb.cs.depaul.edu/noriko/papers/iis09.pdf.

Mylonas et al., Article entitled "Personalized information retrieval based on context and ontological knowledge," Retrieved Date: Sep. 30, 2010. Printed in the United Kingdom and Presented in The Knowledge Engineering Review, vol. 23:1, 73-100; 2007, Cambridge University Press, 28 pages. http://citeseerx.ist.psu.edu/viewdoc/download?doi=10.1.1.148.4272&rep=rep1&type=pdf.

Abstract entitled "Adding Intelligence to the Interface," Published Date: 1996 IEEE; 12 pages. http://www.hitl.washington.edu/publications/billinghurst/vrais96/.

Turunen et al. Article entitled "Multimodal Interaction with Speech and Physical Touch Interface in a Media Center Application," Presented and Published Oct. 29-31, 2009 at Ace 2009 in Athens,

(56) References Cited

OTHER PUBLICATIONS

Greece; 8 pages. http://delivery.acm.org/10.1145/1700000/1690392/p19-turunen.pdf?key1=1690392&key2=5824375821&coll=GUIDE&dl=GUIDE&CFID=103676711&CFTOKEN=24231502.

Moustakas et al., Article entitled "MASTER-PIECE: A Multimodal (Gesture+Speech) Interface for 3D Model Search and Retrieval Integrated in a Virtual Assembly Application," Presented and Published Jul. 18-Aug. 12, 2005 at Enterface '05 in Mons, Belgium; 14 pages. http://www.enterface.net/enterface05/docs/results/reports/project7.pdf.

Lee e al., Article entitled "An Implementation of Multi-Modal Game Interface Based on PDAs," Published Date: Aug. 2007 at the IEEE Fifth International Conference on Software Engineering Research, Management and Applications; 8 pages. http://ieeexplore.ieee.org/stamp/stamp.jsp?tp=&arnumber=4297013.

Mark Billinghurst, Article entitled "Put That Where? Voice and Gesture at the Graphics Interface," Published in the Nov. 1998 Computer Graphics, 5 pages. http://delivery.acm.org/10.1145/310000/307730/p60-billinghurst.pdf?key1=307730&key2=0278375821&coll=GUIDE&dl=GUIDE&CFID=103683245&CFTOKEN=90378528.

Stegmann, et al., Abstract entitled "Multimodal Interaction for Access to Media Content," Retrieved Date: Sep. 29, 2010; 4 pages. http://www.icin.biz/files/2008papers/Poster-08.pdf.

Horiguchi et al., Abstract entitled "GaChat: A chat system that displays online retrieval information in dialogue text," Published at the Workshop on Visual Interfaces to the Social and the Semantic Web Conference Feb. 8, 2009 in Sanibel Island, Florida; 5 pages. http://www.smart-ui.org/events/vissw2009/papers/VISSW2009-Horiguchi.pdf.

Aye, et al., Article entitled "Use of Ontologies for Bridging Semantic Gaps in Distant Communication," Published Date: 2008; 5 pages. http://ieeexplore.ieee.org/stamp/stamp.jsp?tp=&arnumber=4781725.

Jebara et al., Article entitled "Tracking Conversational Context for Machine Mediation of Human Discourse," Retrieved Date: Oct. 1, 2010; 3 pages. http://www.cs.columbia.edu/~jebara/papers/conversation.pdf.

Power Point Presentation entitled "Spoken Language Understanding for Conversational Dialog Systems," Presented and published at the IEEE/ACL 2006 Workshop on Spoken Language Technology in Aruba, Dec. 10-13, 2006; 33 pages. http://www.slt2006.org/MichaelMcTear.ppt.

Fabbrizio et al., Abstract entitled "Bootstrapping Spoken Dialog Systems with Data Reuse," Retrieved Date: Oct. 12, 2010; 9 pages. http://www.sigdial.org/workshops/workshop5/proceedings/pdf/difabbrizio.pdf.

Website: Siri: Your Personal Assistant for the Mobile Web—Published Date: Feb. 4, 2010; 3 pages. http://www.readwriteweb.com/archives/siri_your_personal_assistant_for_the_mobile_web.php.

Abela, et al., Abstract entitled "SemChat: Extracting Personal Information from Chat Conversations," Retrieved Date: Oct. 12, 2010; 10 pages. http://staff.um.edu.mt/cabe2/supervising/undergraduate/overview/keith_cortis.pdf.

Robert Brown, Article entitled "Exploring New Speech Recognition and Synthesis APIs in Windows Vista," published in MSDN Magazine, Retrieved Date: Oct. 12, 2010; 11 pages. http://msdn.microsoft.com/en-us/magazine/cc163663.aspx.

U.S. Patent Application entitled "Augmented Conversational Understanding Agent" having U.S. Appl. No. 13/076,862, filed Mar. 31, 2011.

U.S. Patent Application entitled "Conversational Dialog Learning and Correction" having U.S. Appl. No. 13/077,233, filed Mar. 31, 2011.

U.S. Patent Application entitled "Personalization of Queries, Conversations, and Searches" having U.S. Appl. No. 13/077,303, filed Mar. 31, 2011.

U.S. Patent Application entitled "Task Driven User Intents" having U.S. Appl. No. 13/077,396, filed Mar. 31, 2011.

U.S. Patent Application entitled "Augmented Conversational Understanding Architecture" having U.S. Appl. No. 13/077,431, filed Mar. 31, 2011.

U.S. Patent Application entitled "Location-Based Conversational Understanding" having U.S. Appl. No. 13/077,455, filed Mar. 31, 2011.

Lee, et al. Abstract entitled "Simplification of Nomenclature Leads to an Ideal IL for Human Language Communication"—Published Date: Oct. 28, 1997, at the AMTA/SIG-IL First Workshop on Interlinguas, San Diego, CA., Oct. 28, 1997; pp. 71-72; 2 pgs. Obtained at: http://www.mt-archive.info/AMTA-1997-Lee.pdf.

Kuansan Wang, Abstract entitled "Semantics Synchronous Understanding for Robust Spoken Language Applications"—Published Date: 2003, pp. 640-645; 6 pgs. Obtained at: http://research.microsoft.com/pubs/77494/2003-kuansan-asru.pdf.

Antoine, et al., Abstract entitled "Automatic Adaptive Understanding of Spoken Language by Cooperation of Syntactic Parsing and Semantic Priming"—Published Date: 1994; 5 pgs. Obtained at: http://www-clips.imag.fr/geod/User/jean.caelen/Publis_fichiers/SyntaxeSemamtique.pdf.

Tur, et al., Abstract entitled "Semi-Supervised Learning for Spoken Language Understanding Using Semantic Role Labeling"—Published Date: 2005, pp. 232-237; 6 pgs. Obtained at: http://ieeexplore.ieee.org/stamp/stamp.jsp?arnumber=01566523.

Finkel, et al., Abstract entitled "Incorporating Non-Local Information into Information Extraction Systems by Gibbs Sampling"—Published Date: Jan. 3, 2006, 8 pgs. Obtained at: http://n1p.stanford.edu/~manning/papers/gibbscrf3.pdf.

Wang, et al, Article entitled "An Introduction to the Statistical Spoken Language Understanding"—Published in the IEEE Signal Processing Magazine, vol. 22, No. 5, pp. 16-31; 2005. http://research.microsoft.com/pubs/75236/2005-Wang-Deng-Acero-SPM.pdf.

Gorin, et al., Abstract entitled "How May I Help You?" Published in Speech Communication 23, Feb. 14, 1997, Revised May 23, 1997; pp. 113-127, 14 pgs. http://disi.unitn.it/~riccardi/papers/specom97.pdf.

P. J. Price, Abstract entitled "Evaluation of Spoken Language Systems: The ATIS Domain" Obtained on May 12, 2011, 5 pgs. from the following website: http://ac1.1dc.upenn.edu/H/H90/H90-1020.pdf.

Raymond, et al, Abstract entitled "Generative and Discriminative Algorithms for Spoken Language Understanding", Published Aug. 27-31, 2007 at the Interspeech 2007 Conference in Antwerp, Belgium; pp. 1605-1608, 4 pgs. Obtain at: http://citeseerx.ist.psu.edu/viewdoc/download?doi=10.1.1.106.2105&rep=rep1&type=pdf.

Jeong, et al., Abstract entitled "Exploiting Non-Local Features for Spoken Language Understanding" Published in the Proceedings of the COLING/ACL 2006 Main Conference Poster Sessions, pp. 412-419 in Sydney, Australia Jul. 2006; 8 pgs. Obtained at: http://www.aclweb.org/anthology/P/P06/P06-2054.pdf.

Moschitti, et al., Abstract entitled "Spoken Language Understanding with Kernels for Syntactic/ Semantic Structures" Published in the 2007 IEEE Proceedings, pp. 183-188; 6 pgs. Obtained at: http://ieeexplore.ieee.org/stamp/stamp.jsp?tp=&arnumber=4430106.

Hakkani-Tur, et al. Abstract entitled "Using Semantic and Syntactic Graphs for Call Classification" Published in the Proceedings of the ACL Workshop on Feature Engineering for Machine Learingin in NLP, pp. 24-31 in Ann Arbor, Michigan, Jun. 2005; 8 pgs. Obtained at: http://citeseerx.ist.psu.edu/viewdoc/download?doi=10.1.1.59.8566&rep=rep1&type=pdf.

Dowding, et al. Article entitled "Gemini: A Natural Language System for Spoken Language Understanding" pp. 54-61; 8 pgs. Obtained on May 12, 2011 at website: http://acl.ldc.upenn.edu/P/P93/P93-1008.pdf.

Stephanie Seneff. Article entitled "TINA: A Natural Language System for Spoken Language Applications" Published in the 1992 Edition of Association for Computational Linguistics, vol. 18, No. 1, pp. 61-86; 26 pgs. Obtained at: http://citeseerx.ist.psu.edu/viewdoc/download?doi=10.1.1.75.1626&rep=rep1&type=pdf.

(56) References Cited

OTHER PUBLICATIONS

Ward, et al. Abstract entitled "Recent Improvements in the CMU Spoken Language Understanding System." 4 pgs. Obtained on May 12, 2011 at website: http://www.aclweb.org/anthology/H/H94/H94-1039.pdf.
Vickrey, et al. Abstract entitled "Sentence Simplification for Semantic Role Labeling." 9 pgs. Obtained on May 12, 2011 at website: http://ai.stanford.edu/~dvickrey/underlying.pdf.
Vanderwende, et al. Abstract entitled "Microsoft Research at DUC2006: Task-Focused Summarization with Sentence Simplification and Lexical Expansion." 8 pgs. Obtained on May 12, 2011 at website: http://citeseerx.ist.psu.edu/viewdoc/download?doi=10.1.1.114.2486&rep=rep1&type=pdf.
Petrov et al., Abstract entitled "Learning and Inference for Hierarchically Split PCFGs" Published in 2007 in cooperation with the Association for the Advancement of Artificial Intelligence. 4 pgs. Obtained at: http://www.petrovi.de/data/aaai07.pdf.
Schapire, et al. Abstract entitled "BoosTexter: A Boosting-Based System for Text Categorization," 34 pgs. Obtaining May 12, 2011 at website: http://citeseerx.ist.psu.edu/viewdoc/download?doi=10.1.1.33.1666&rep=rep1&type=pdf.
He, et al. Abstract entitled "A Data-Driven Spoken Language Understanding System." 6 pgs. Obtained on May 12, 2011 at website: http://citeseerx.ist.psu.edu/viewdoc/download?doi=10.1.1.141.5688&rep=rep1&type=pdf.
Yaman, et al., Article entitled "An Integrative and Discriminative Technique for Spoken Utterance Classification," Published in the IEEE Transactions on Audio, Speech, and Language Processing Magazine, vol. 16, No. 6, Aug. 2008. pp. 1207-1214; 8 pgs. http://research.microsoft.com/pubs/73918/sibel.pdf.
Gillick, et al. Article entitled "Some Statistical Issues in the Comparison of Speech Recognition Algorithms." Published in the Proceedings at the IEEE Conference on Acoustics, Speech and Sig. Proc., Glasglow, 1989; pp. 532-535; 4pgs. http://citeseerx.ist.psu.edu/viewdoc/download?doi=10.1.1.162.2233&rep=rep1&type=pdf.
Tur, et al., Abstract entitled "What is Left to be Understood in ATIS?" Published in the Proceedings of the IEEE SLT Workshop in Berkeley, CA., 2010. (not readily available on any website); 6 pgs.
Brody, et al., Body language user interface (BLUI)', http://adsabs.harvard.edu/abs/1998SPIE.3299..400B, accessed Aug. 17, 2009, 1 page.
Corominas, Aurora, "The Artist's Gesture. An initial approach to the cinematic representation of Vincent Van Gogh's pictorial practice", http://www.iua.upf.es/formats/formats3/cor_a.htm, accessed Aug. 17, 2009, 12 pages.
Gao et al., "VS: Facial Sculpting in the Virgual World", International Conference on Computational Intelligence for Modeling Control and Automation, and International Conference on Intelligent Agents, Web Technologies and Internet Commerce (CIMCA-IAWTIC'06), IEEE Computer Society, Aug. 17, 2009, 6 pages.
Hauptmann, "Speech and Gestures for Graphic Image Manipulation", CHI'89 Proceedings, Department of Computer Science, Carnegie-Mellon University, Pittsburgh, Penn., May 1989, 20(SI), 241-245.
Qian et al., "A Gesture-Driven Multimodal Interactive Dance System", IEEE International Conference on Multimedia and Expo,Taipei, Jun. 2004, vol. 3, pp. 1579-1582.
Shivappa et al., "Person Tracking with Audio-Visual Cues Using Iterative Decoding Framework", IEEE Fifth International Conference on Advanced Video and Signal Based Surveillance, AVSS '08, Santa Fe, MM, Sep. 1-3, 2008, pp. 260-267.
U.S. Patent Application entitled "Sentence Simplification for Spoken Language Understanding" having U.S. Appl. No. 13/106,374, filed May 12, 2011.
U.S. Official Action dated May 10, 2012, in U.S. Appl. No. 12/604,526. 21 pgs.
U.S. Official Action dated Jun. 11, 2013, in U.S. Appl. No. 13/077,455.
U.S. Official Action dated Jul. 25, 2013 in U.S. Appl. No. 13/077,431.
U.S. Official Action dated Aug. 1, 2013 in U.S. Appl. No. 13/076,862.
"International Search Report & Written Opinion for PCT Patent Application No. PCT/US2013/055232", Mailed Date: Nov. 18, 2013, Filed Date: Aug. 16, 2013, 10 pages.
U.S. Official Action dated Dec. 24, 2013 in U.S. Appl. No. 13/592,638, 31 pgs.
U.S. Official Action dated Jan. 7, 2014, in U.S. Appl. No. 13/077,303, 26 pgs.
U.S. Official Action dated Jan. 28, 2014, in U.S. Appl. No. 13/077,455, 27 pgs.
U.S. Official Action dated Feb. 24, 2014, in U.S. Appl. No. 13/077,396, 50 pgs.
U.S. Official Action dated Feb. 28, 2014, in U.S. Appl. No. 13/077,233, 53 pgs.
G. Tur and R. D. Mori, Eds., Spoken Language Understanding: Systems for Extracting Semantic Information from Speech. New York, NY: John Wiley and Sons, 2011, 484 pgs.
U.S. Official Action dated Mar. 20, 2014 in U.S. Appl. No. 13/076,862, 35 pgs.
U.S. Official Action dated May 15, 2014 in U.S. Appl. No. 13/106,374, 56 pgs.
U.S. Official Action dated Jun. 26, 2014, in U.S. Appl. No. 13/077,455, 26 pgs.
U.S. Official Action dated Jul. 10, 2014, in U.S. Appl. No. 13/077,303, 31 pgs.
U.S. Official Action dated Sep. 5, 2014, in U.S. Appl. No. 13/077,431, 38 pgs.
U.S. Official Action dated Oct. 2, 2014 in U.S. Appl. No. 13/106,374, 42 pgs.
U.S. Official Action dated Oct. 10, 2014, in U.S. Appl. No. 13/077,233, 51 pgs.
Richard A. Bolt, "Put-That-There": Voice and Gesture at the Graphics Interface, Architecture Machine Group, MIT, 1980, 9 pgs.
U.S. Official Action dated Oct. 29, 2014, in U.S. Appl. No. 13/077,455, 27 pgs.
U.S. Official Action dated Nov. 3, 2014, in U.S. Appl. No. 13/077,303, 28 pgs.
U.S. Official Action dated Nov. 19, 2014, in U.S. Appl. No. 13/077,396, 55 pgs.
EP Communication dated Apr. 20, 2015 in Application No. PCT/US2012/030636, 8 pgs.
EP Supplementary Search Report Received for European Patent Application No. PCT/US2012/031736, Mailed Date: May 11, 2015, 10 Pages.
EP Search Report Issued in European Patent Application No. PCT/US2012/030730, Mailed Date: May 11, 2015, 9 Pages.
EP Supplementary Search Report Issued in European Patent Application No. PCT/US2012/031722, Mailed Date: May 11, 2015, 11 Pages.
EP Search Report Received for European Patent Application No. 12765896.1, Mailed Date: May 28, 2015, 12 Pages.
Díaz et al., "CO-Prétegé: A Groupware Tool for Supporting Collaborative Ontology Design with Divergence"; alicia. diaz@sol.info.unlp.edu.ar; Jul. 18, 2005; [retrieved Mar. 26, 2015]; 4 pgs.
Hu, et al., "SmartContext: An Ontology Based Context Model for Cooperative Mobile Learning", In Computer Supported Cooperative Work in Design III, May 3, 2006, pp. 717-726.
Siebra, et al., "SmartCha—An Intelligent Environment for Collaborative Discussions", In Proceedings of 7th International Conference on Intelligent Tutoring Systems, Aug. 30, 2004, pp. 883-885.
Cozzolongo, et al., "Personalized Control of Smart Environments", In Lecture Notes in Computer Science, vol. 4511, Jul. 25, 2007, 5 Pages.
Nijholt, et al., "Google Home: Experience, Support and Re-Experience of Social Home Activities", In Information Sciences, vol. 178, Issue 3, Nov. 6, 2007, 19 Pages.
Pissinou, et al., "A Roadmap to the Utilization of Intelligent Information Agents: Are Intelligent Agents the Link Between the Database and Artificial Intelligence Communities?", In IEEE Knowledge and Data Engineering Exchange Workshop, Jan. 1, 1997, 10 Pages.
Notice of Allowance dated Dec. 3, 2014 in U.S. Appl. No. 13/592,638, 23 pgs.

(56) References Cited

OTHER PUBLICATIONS

Notice of Allowance dated Feb. 17, 2015 in U.S. Appl. No. 13/592,638, 12 pgs.
U.S. Official Action dated Mar. 19, 2015, in U.S. Appl. No. 13/077,431, 24 pgs.
U.S. Official Action dated May 5, 2015, in U.S. Appl. No. 13/077,455, 14 pgs.
U.S. Official Action dated May 28, 2015 in U.S. Appl. No. 13/106,374, 44 pgs.
U.S. Official Action dated Jun. 4, 2015, in U.S. Appl. No. 13/077,396, 35 pgs.
U.S. Official Action dated Jun. 12, 2015, in U.S. Appl. No. 13/077,303, 25 pgs.
U.S. Official Action dated Jul. 1, 2015 in U.S. Appl. No. 13/076,862, 60 pgs.
International Search Report & Written Opinion for PCT/US2010/0536632 dated Jun. 3, 2011.
International Search Report & Written Opinion in PCT/US2012/031722 dated Oct. 23, 2012.
International Search Report & Written Opinion in PCT/US2012/031736 dated Oct. 31, 2012.
International Search Report & Written Opinion in PCT/US2012/030730 dated Oct. 30, 2012.
International Search Report & Written Opinion in PCT/US2012/030636 dated Oct. 31, 2012.
International Search Report & Written Opinion in PCT/US2012/030740 dated Nov. 1, 2012.
International Search Report & Written Opinion in PCUUS2012/030757 dated Nov. 1, 2012.
International Search Report & Written Opinion in PCT/US2012/030751 dated Sep. 5, 2012.
Aggarwal et al.. "Human Motion Analysis: A Review", IEEE Nonrigid and Articulated Motion Workshop, 1997, University of Texas at Austin, Austin, TX.
Agichtein, et al., "Improving Web Search Ranking by Incorporating User Behavior Information", In Proceedings of the 29th Annual International ACM SIGIR Conference on Research and Development in Information Retrieval, Aug. 6, 2006, 8 pgs.
Azarbayejani et al., "Visually Controlled Graphics", Jun. 1993, vol. 15, No. 6, IEEE Transactions on Pattern Analysis and Machine Intelligence.
Breen et al., "Interactive Occlusion and Collusion of Real and Virtual Objects in Augmented Reality", Technical Report ECRC-95-02, 1995, European Computer-Industry Research Center GmbH, Munich, Germany.
Brogan et al., "Dynamically Simulated Characters in Virtual Environments", Sep./Oct. 1998, pp. 2-13, vol. 18, Issue 5, IEEE Computer Graphics and Applications.
A. Celikyilmaz, D. Hakkani-Tür, and G. Tur, "Approximate Interference for Domain Detection in Spoken Language Understanding," in Proceedings of Interspeech, Florence, Italy, 2011.
Fisher et al., "Virtual Environment Display System", ACM Workshop on Interactive 3D Graphics, Oct. 1986, Chapel Hill, NC.
Freeman et al., "Television Control by Hand Gestures", Dec. 1994, Mitsubishi Electric Research Laboratories, TR94-24, Caimbridge, MA.
Fukumoto et al., "'Finger-Pointer': Pointing Interface by Image Processing", Comput. & Graphics, vol. 18, No. 5, pp. 633-642, 1994.
Granieri et al., "Simulating Humans in VR", The British Computer Society, Oct. 1994, Academic Press.
Haffner, et al., "Optimizing SVMS for Complex Call Classification", In Proceedings of IEEE International Conference on Acoustics, Speech, and Signal Processing, Apr. 6, 2003, 4 pages.
D. Hakkani-Tur, G. Tur, L. Heck, and E. Shriberg, "Bootstrapping Domain Detection Using Query Click Logs for New Domains," In Proceedings of Interspeech, Florence, Italy, 2011.
Hakkani-Tur, et al., "Employing Web Search Query Click Logs for Multi-Domain Spoken Language Understanding", In Proceedings of IEEE Workshop on Automatic Speech Recognition and Understanding, Dec. 11, 2011, 6 pgs.
Hakkani-Tur, et al., "Exploiting Query Click Logs for Utterance Domain Detection in Spoken Language Understanding", In Proceedings of International Conference on Acoustics, Speech and Signal Processing, May 22, 2011, 4 pages.
Hakkani-Tur, et al., "Mining Search Query Logs for Spoken Language Understanding", In Workshop on Future Directions and Needs in the Spoken Dialog Community: Tools and Data, Jun. 7, 2012, pp. 37-40.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
He, "Generation of Human Body Models", Apr. 2005, University of Auckland, New Zealand.
D. Hillard, A. Celikyilmaz, D. Hakkani-Tür, and G. Tur, "Learning Weighted Entity Lists from Web Click Logs for Spoken Language Understanding," in Proceedings of Interspeech, Florence, Italy, 2011.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Isard et al., "Condensation—Conditional Density Propagation for Visual Tracking", 1998, pp. 5-28, International Journal of Computer Vision 29(1), Netherlands.
Jung, J. Jason, "Ontology-based context Synchronization for an ad hoc social collaborations," Knowledge-Based Systems, vol. 21, 2008, pp. 573-580.
Kanade, et al., "A Stereo Machine for Video-Rate Dense Depth Mapping and Its New Applications", IEEE Computer Society Conference on Computer Vision and Pattern Recognition, 1996, pp. 196-200, The Robotics Institue, Carnegie Mellon University, Pittsburgh, PA.
Koehn, et al., "Moses: Open Source Toolkit for Statistical Machine Translation", In Proceedings of the Annual Meeting of the Association for Computational Linguistics, Demonstration and Poster Session, Jun. 2007, 4 pages.
Kohler, "Special Topics of Gesture Recognition Applied in Intelligent Home Environments", In Proceedings of the Gesture Workshop, 1998, pp. 285-296, Germany.
Kohler, "System Architecture and Techniques for Gesture Recognition in Unconstrained Environments" International Conference on Virtual Systems and Multimedia, 10 pages, 1997.
Kohler, "Technical Details and Ergonomical Aspects of Gesture Recognition Applied in Intelligent Home Environments", 1997, Germany.
Kohler, "Vision Based Remote Control in Intelligent Home Environments", University of Erlangen-Nurembergl Germany, 1996, pp. 147-154, Germany.
Kok, et al., "Hitting the Right Paraphrases in Good Time", In Proceedings of Human Language Technologies: The Annual Conference of the North American Chapter of the Association for Computational Linguistics, Jun. 2010, 9 pgs.
Livingston, "Vision-based Tracking with Dynamic Structured Light for Video See-through Augmented Reality", 1998, University of North Carolina at Chapel Hill, North Carolina, USA.
McKenzie Mills et al., "Integrating Speech and Two-dimensional Gesture Input—A Study of Redundancy Between Modes" Computer Human Interaction Conference, 4 pages, 1998.
Mittal, et al., "A Hybrid Approach of Personalized Web Information Retrieval." Proceedings of the 2010 IEEE/WIC/ACM International Conference on Web Intelligence and Intelligent Agent Technology, Aug. 31, 2010, vol. 1, pp. 308-313.
Miyagawa et al., "CCD-Based Range Finding Sensor", Oct. 1997, pp. 1648-1652, vol. 44, No. 10, IEEE Transactions on Electron Devices.
Och, et al., "A Systematic Comparison of Various Statistical Alignment Models", In Journal of Computational Linguistics, vol. 29, Issue 1, Mar. 2003, 33 pages.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

(56) References Cited

OTHER PUBLICATIONS

Riezler, et al., "Query Rewriting Using Monolingual Statistical Machine Translation", In Journal of Computational Linguistics Archive, vol. 36, Issue 3, Sep. 2010, pp. 569-582.
Rosenhahn et al., "Automatic Human Model Generation", 2005, pp. 41-48, University of Auckland (CITR), New Zealand.
"Simulation and Training", 1994, Division Incorporated.
Shao et al., "An Open System Architecture for a Multimedia and Multimodal User Interface", Aug. 24, 1998, Japanese Society for Rehabilitation of Persons with Disabilities (JSRPD), Japan.
Sheridan et al., "Virtual Reality Check", Technology Review, Oct. 1993, pp. 22-28, vol. 96, No. 7.
Starner et al., "The Gesture Pendant: A Self-Illuminating, Wearable, Infrared Computer Vision System for Home Automation Control and Medical Monitoring" International Symposium on Wearable Computers. Digest of Papers, No. 4, Oct. 16, 2000.
Stevens, "Flights into Virtual Reality Treating Real World Disorders", The Washington Post, Mar. 27, 1995, Science Psychology, 2 pages.
Tur, et al., "Model Adaptation for Dialog Act Tagging", In Proceedings of IEEE Spoken Language Technology Workshop, Dec. 10, 2006, 4 pages.
Tur, et al., "Sentence Simplification for Spoken Language Understanding", In Proceedings of International Conference on Acoustics, Speech and Signal Processing, May 22, 2011, 4 pages.
"Virtual High Anxiety", Tech Update, Aug. 1995, pp. 22.
Wren et al.. "Pfinder: Real-Time Tracking of the Human Body". MIT Media Laboratory Perceptual Computing Section Technical Report No. 353. Jul. 1997, vol. 19, No. 7, pp. 780-785, IEEE Transactions on Pattern Analysis and Machine Intelligence, Caimbridge, MA.
Zhao, "Dressed Human Modeling, Detection, and Parts Localization", 2001, The Robotics Institute, Carnegie Mellon University, Pittsburgh, PA.
U.S. Patent Application entitled "Translating Natural Language Utterances to Keyword Search Queries" having U.S. Appl. No. 13/592,638, filed Aug. 23, 2012.
U.S. Official Action dated Aug. 24, 2012, in U.S. Appl. No. 13/077,431.
U.S. Official Action dated Jan. 3, 2013, in U.S. Appl. No. 12/604,526, 24 pgs.
U.S. Official Action dated May 29, 2013, in U.S. Appl. No. 13/077,303.
Notice of Allowance dated Sep. 18, 2015, in U.S. Appl. No. 13/077;455, 22 pgs.
EP Extended Search Report Received for European Patent Application No. 12763913.6, Mailed Date, Sep. 1, 2015, 13 pgs.
Taiwan Search Report Issued in Patent Application No. 101105673, Mailed Date: Oct. 16, 2015, 9 pages.
Klusch; "Information Agent Technology for the Internet: A Survey"; Data & Knowledge Engineering; vol. 36, Mar. 1; 2001, 36 pgs.
Penton et al., "Common Sense Reasoning+From Cyc to Intelligent Assistant"; Cycorp, Inc.; Jan. 1, 2006; Ambient Intelligence in Everyday Life Lecture Notes in Computer Science; 32 pgs.
Kolski et al.; "A Review of Intelligent Human-Machine Interfaces in the Light of the Arch Model", Published online Nov. 13, 2009; International Journal of Human-Computer Interaction; vol. 10, No. 3; Sep. 1, 1998.
U.S. Official Action dated Nov. 27, 2015, in U.S. Appl. No. 13/077,431, 15 pgs.
U.S. Official Action dated Dec. 4, 2015, in U.S. Appl. No. 13/077,396, 45 pgs.
U.S. Official Action dated Dec. 4, 2015 in U.S Appl. No. 13/106,374, 64 pgs.
U.S. Official Action dated Dec. 7, 2015, in U.S. Appl. No. 13/077,303, 32 pgs.

\* cited by examiner

COMBINED ACTIVATION FOR NATURAL USER INTERFACE SYSTEMS

RELATED APPLICATIONS

This patent application is also related to and filed concurrently with U.S. patent application Ser. No. 13/076,862, entitled "Augmented Conversational Understanding Agent," filed on Mar. 31, 2011; U.S. patent application Ser. No. 13/077,233 entitled "Conversational Dialog Learning and Correction," filed on Mar. 31, 2011; U.S. patent application Ser. No. 13/077,303, entitled "Personalization of Queries, Conversations, and Searches," filed on Mar. 31, 2011; U.S. patent application Ser. No. 13/077,396, entitled "Task Driven User Intents," filed on Mar. 31, 2011; U.S. patent application Ser. No. 13/077,431, entitled "Augmented Conversational Understanding Architecture," filed on Mar. 31, 2011; U.S. patent application Ser. No. 13/077,455 entitled "Location-Based Conversational Understanding," filed on Mar. 31, 2011; which are assigned to the same assignee as the present application and expressly incorporated herein, in their entirety, by reference.

BACKGROUND

A combined activation for a natural user interface may provide a multimodal natural user interface activation system that may use multiple modes to activate or operate an application. In some situations, natural user interface systems focus on a single mode of activation or operation. For example, a user activates an application by voice command or by tapping on a screen. However, single mode activation of commands in conventional systems can be hypersensitive or prone to various types of inaccuracies, such as unintentional activation.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A user interaction activation may be provided. A plurality of signals received from a user may be evaluated to determine whether the plurality of signals are associated with a visual display. If so, the plurality of signals may be translated into an agent action and a context associated with the visual display may be retrieved. The agent action may be performed according to the retrieved context and a result associated with the performed agent action may be displayed to the user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
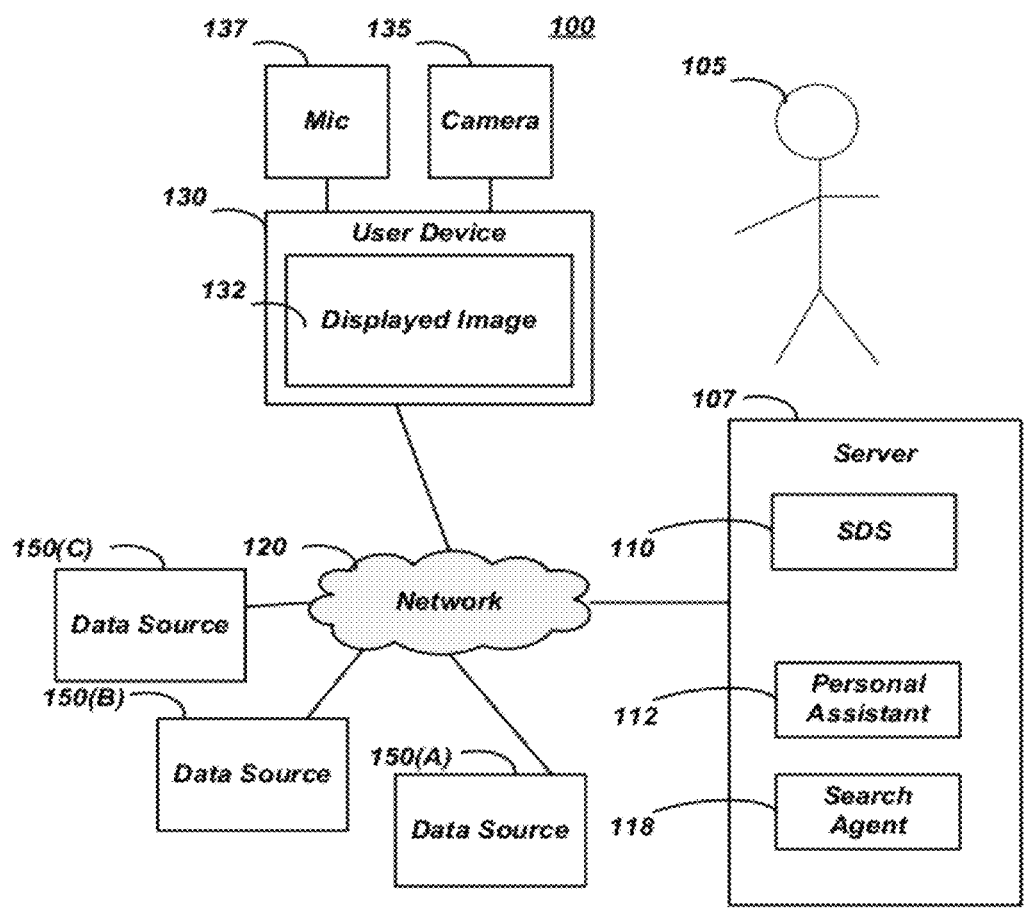
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Spoken dialog systems (SDS) enable people to interact with computers with their voice. The primary component that drives the SDS may comprise a dialog manager: this component manages the dialog-based conversation with the user. The dialog manager may determine the intention of the user through a combination of multiple sources of input, such as speech recognition and natural language understanding component outputs, context from the prior dialog turns, user context, and/or results returned from a knowledge base (e.g., search engine). After determining the intention, the dialog manager may take an action, such as displaying the final results to the user and/or continuing in a dialog with the user to satisfy their intent.

FIG. 1 is a block diagram of an operating environment 100 comprising a user 105, a server 107, a network 120, and a user device 130. Server 107 may comprise a spoken dialog system (SDS 110, a personal assistant program 112, and/or a search agent 118). SDS 110 may be operative to receive user phrases, queries, actions, and/or action requests via a network 120. Network 120 may comprise a private network (e.g., a corporate intranet), a cellular network, and/or a public network such as the Internet. Operating environment 100 may further comprise a plurality of data sources 150(A)-(C). User device 130 may be operative to provide a displayed image 132 such as that associated with photos, videos, and/or games. User device 130 may be coupled to a camera 135 that may be operative to record user 105 and capture motions and/or gestures made by user 105. User device 130 may be further operative to capture words spoken by user 105, such as by a microphone 136, and/or capture other inputs from user 105 such as by a keyboard and/or mouse (not pictured). Consistent with embodiments of the invention, camera 135 may comprise any motion detection device capable of detecting the movement of user 105. For example, camera 135 may comprise a Microsoft® Kinect® motion capture device comprising a plurality of cameras and a plurality of microphones.

Figure 2:
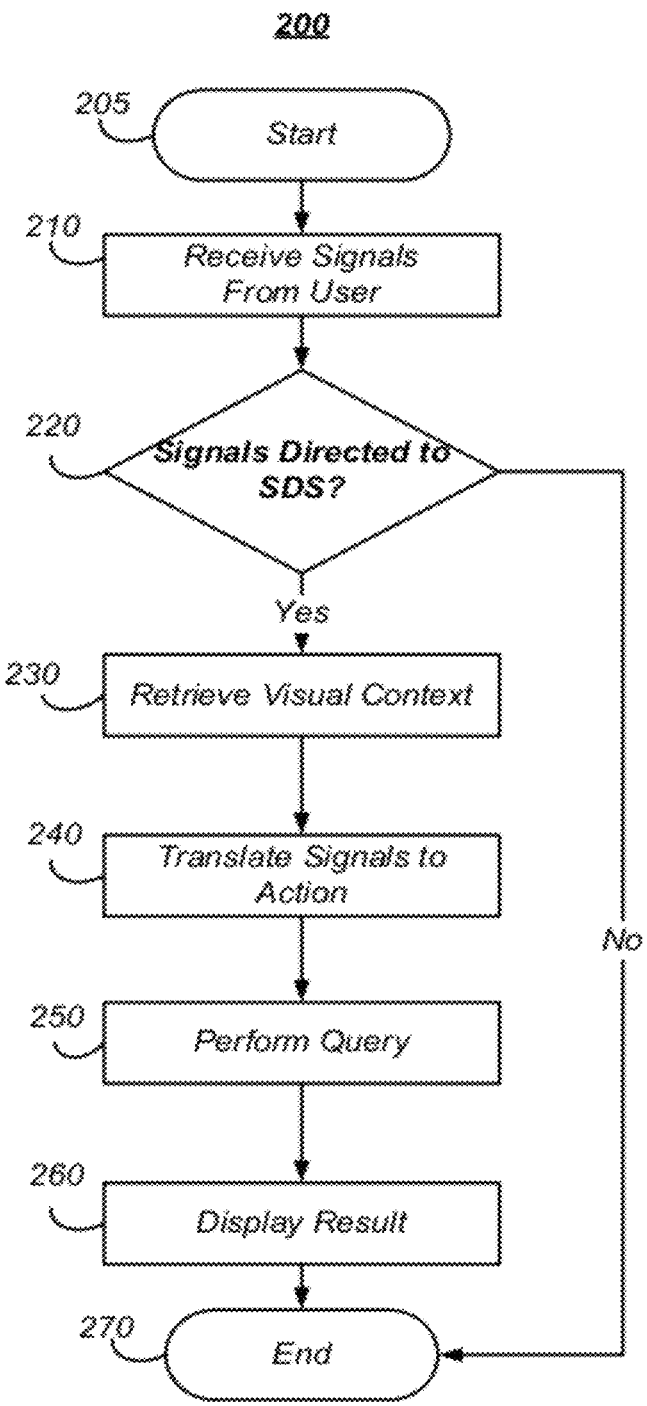
FIG. 2 is a flow chart of a method for providing a user-interaction activation.

FIG. 2 is a flow chart setting forth the general stages involved in a method 200 consistent with an embodiment of the invention for providing personalization of a user query. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may receive a plurality of signals from a user. For example, SDS 110 may receive a spoken query and identify a first gesture performed by user 105 by camera 135. For example, user may wave and say a command like 'hey xbox'.

Method 200 may then advance to stage 220 where computing device 300 may determine whether the signals are directed to the system. For example, user 105 pointing to the screen may comprise an activation gesture while user 105 walking past camera 135 may not. Consistent with embodiments of the invention, user 105 may define any gesture as an associated gesture. If the identified gesture and/or the speech signal is identified as not being directed to SDS 110, method 200 may end at stage 275.

If the signals are directed to the system, method 200 may advance to stage 230 where computing device 300 may retrieve a context associated with a visual display. For example, metadata may be associated with a video stream providing information such as the title, actors, description, ratings, etc. For another example, the context may be retrieved from one of data sources 150(A)-(C). For example, data source 150(A) may comprise a movie information website.

Method 200 may then advance to stage 240 where computing device 300 may translate the received signals into an agent action. For example, camera 135 may capture a pointing gesture of user 105 that may be operative to indicate a subset of the visual display. For example, there may be three actors in a current frame of a movie video, and the camera may identify which of the three actors user 105 is pointing to. This indication may be used to create an agent action in association with a speech query such as "Who is that actor?". The agent action may thus be able to selectively identify which of the three actors the user is indicating.

Method 200 may then advance to stage 250 where computing device 300 may perform the agent action according to the retrieved context and the received signals. For example, SDS 110 may retrieve a list of all actors in the displayed movie from data source 150(A), narrow the results to the three actors displayed at the time the signals were received, and identify the specific actor according to which one user 105 was pointing at.

Method 200 may then advance to stage 260 where computing device 300 may display a result associated with the performed query to the user. For example, a caption may be displayed on user device 130 providing the result of the query. Method 200 may then end at stage 275.

An embodiment consistent with the invention may comprise a system for providing a user-interaction activation. The system may comprise a memory storage and a processing unit coupled to the memory storage. The processing unit may be operative to receive a query from a user, retrieve a context associated with a visual display, perform the query according to the retrieved context, and display a result associated with the performed query to the user. The visual display may comprise, for example, a still image, a video, and/or a game image. Being operative to perform the query according to the retrieved context may comprise the processing unit being operative to narrow down a plurality of results to a subset of the plurality of results according to the retrieved context. The processing unit may be further operative to receive a gesture from the user, update the retrieved context according to the gesture (e.g., a pointing gesture), and perform the query according to the updated context. Being operative to update the retrieved context according to the pointing gesture may comprise the processing unit being operative to identify an element of the visual display indicated by the pointing gesture.

Another embodiment consistent with the invention may comprise a system for providing a user-interaction activation. The system may comprise a memory storage and a processing unit coupled to the memory storage. The processing unit may be operative to receive a request comprising a natural language phrase (e.g., a spoken phrase), retrieve a context associated with a visual display, identify a gesture performed by the user, perform an action associated with the request according to the retrieved context and the identified gesture, and provide a result associated with the performed action to the user. Consistent with embodiments of the invention, a natural language phrase may comprise spoken and/or conversational grammar rather than a specially formatted query. For example "what is that building" may comprise a natural language phrase and may be associated with a visual display of the movie "Inception." A comparable formatted query such as may be provided to a search engine may comprise "domain: imdb.com title: Inception time: 1:32 'identify building' coordinates: 132,425." The visual display may comprise an image captured by a recording device associated with the user. For example, the user may take a digital picture with a camera and view the image. The user's gesture may comprise an activation gesture. For example, user 105 may point directly at camera 135 to indicate that user 105 is about to issue a query and/or action.

Yet another embodiment consistent with the invention may comprise a system for providing a user-interaction activation. The system may comprise a memory storage and a processing unit coupled to the memory storage. The processing unit may be operative to receive a plurality of contemporaneous signals from a user, wherein at least one first signal comprises a speech signal received via at least one microphone and at least one second signal comprises a gesture received via the at least one camera, and determine whether the first gesture comprises an activation gesture plurality of signals are associated with directed to the system. In response to determining that the plurality of signals are directed to the system, the processing unit may be operative to receive a query from the user, retrieve a context associated with a visual display, identify a second gesture received from the user via the camera, translate the plurality of signals into at least one agent action associated with the visual display, wherein the gesture comprises a pointing gesture operative to select a subset of the visual display, perform the query agent action according to the retrieved context and the identified second gesture and display a result associated with the performed query agent action to the user.

Figure 3:
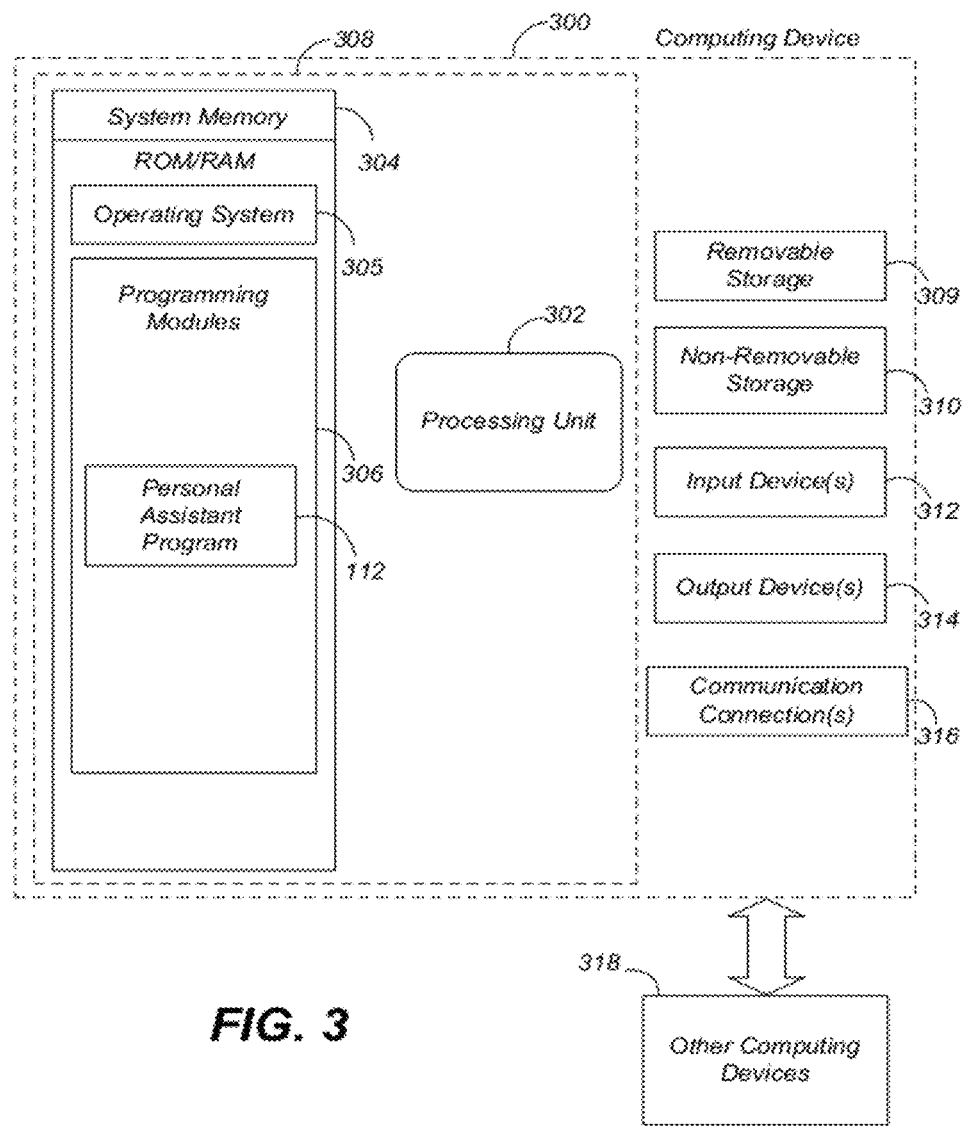
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g., random access memory (RAM)), non-volatile (e.g., read-only memory (ROM)), flash memory, or any combination. System memory 304 may include operating system 305, one or more programming modules 306, and may include personal assistant program 112. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an Intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g., personal assistant program 112) may perform processes including, for example, one or more of method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A system for providing a user-interaction activation, the system comprising:
   a display configured to display a multimedia presentation, the multimedia presentation comprising a series of frames that are displayed sequentially, each frame having a plurality of spatial areas, each spatial area having a context that comprises information relating to the multimedia presentation;
   at least one camera operatively coupled to the display;
   at least one microphone;
   a memory storage; and
   a processing unit coupled to the memory storage, the camera and the microphone, wherein the processing unit is operative to:
   receive, at the at least one microphone, a speech signal;
   analyze the speech signal to identify a request relating to the multimedia presentation, the request relating to a frame;
   receive, at the at least one camera, a gesture identifying a spatial area of the frame;
   create a query based on the request, the identified spatial area, and the context associated with the spatial area;
   perform the query; and
   display a result based on the performed query.

2. The method of claim 1, wherein the speech signal comprises a spoken phrase.

3. The method of claim 1, wherein the multimedia presentation comprises at least [one of the following: a still image displayed to the user and] a video image displayed to the user.

4. The method of claim 1, wherein the gesture and the speech signal are received from the user contemporaneously.

5. The method of claim 1, wherein the display comprises an image captured by a recording device associated with the user.

6. The method of claim 1, wherein the gesture comprises an activation gesture.

7. The method of claim 1, wherein the gesture is identified via a plurality of cameras.

8. The method of claim 1, wherein perform the query comprises querying a database for the result.

9. The method of claim 1, wherein the context associated with the multimedia presentation comprises background information about the multimedia presentation.

10. The method of claim 1, further comprising:
    receive, at the at least one microphone, a second speech signal;
    analyze the second speech signal to identify a second request relating to the multimedia presentation, the second request relating to the frame;
    receive, at the at least one camera, a second gesture identifying a second spatial area of the frame;
    create a second query based on the second request, the identified second spatial area, and the context associated with the second spatial area;
    perform the second query; and
    display a second result based on the performed query.

11. A system for providing user-interaction activation, including:
    at least one processor; and
    a memory operatively coupled to the at least one processor and including instructions that, when executed by the at least one processor, cause the at least one processor to perform a method, the method comprising:
    receiving, at a microphone, a speech signal;
    analyzing the speech signal to identify a request relating to a multimedia presentation displayed on a display,
      wherein the multimedia presentation comprises a series of frames, each frame having a plurality of spatial areas, each spatial area having different information, wherein the frames are displayed sequentially and wherein each frame in the series of frames is associated with a context that comprises informational content of the multimedia presentation;
      wherein the request relates to a frame of the multimedia presentation;
    receiving, at a camera, a gesture identifying a spatial area of the frame;
    creating a query based on the request, the identified spatial area, and the context associated with the frame;
    performing the query; and
    providing a result based on the performed query.

12. A device comprising:
    a display for displaying a multimedia presentation, the multimedia presentation comprising a series of frames, each frame having a plurality of spatial areas, each spatial area having different information, wherein the frames are displayed sequentially, and wherein each frame in the series of frames is associated with a context that comprises informational content of the multimedia presentation;
    a microphone for capturing one or more speech signals;

a motion detector for detecting one or more user gestures, the motion detector operatively connected to the display;

a programmable circuit operatively connected to the display, the microphone, and the motion detector, the programmable circuit configured to execute program instructions which, when executed, cause the device to:

receive, at the microphone, a speech signal;

analyze the speech signal to identify a request relating to the multimedia presentation, the request relating to a frame;

receive, at the motion detector, a user gesture identifying a spatial area of the frame;

create a query based on the request, the identified spatial area, and the context associated with the frame;

send the query to a server;

receive, from the server, a result of the query; and display the result.

13. The device of claim 12, wherein the multimedia presentation comprises at least [one of the following: a still image, a photo, and] a video.

14. The device of claim 12, wherein the device receives the speech signal and the user gesture contemporaneously.

15. The device of claim 12, wherein an image captured by a recording device associated with the user is displayed on the display of the device.

16. The device of claim 12, wherein one of the detected user gestures comprises an activation gesture.

17. The device of claim 12, further comprises a second motion detector operatively connected to the programmable circuit.

18. The device of claim 12, wherein the motion detector comprises at least one of: a video camera and a still camera.

19. The device of claim 12, wherein the context of the multimedia presentation further comprises background information about the multimedia presentation displayed on the device.

20. The device of claim 19, wherein the result is received, over the network from a database.

\* \* \* \* \*